Patented Aug. 24, 1926.

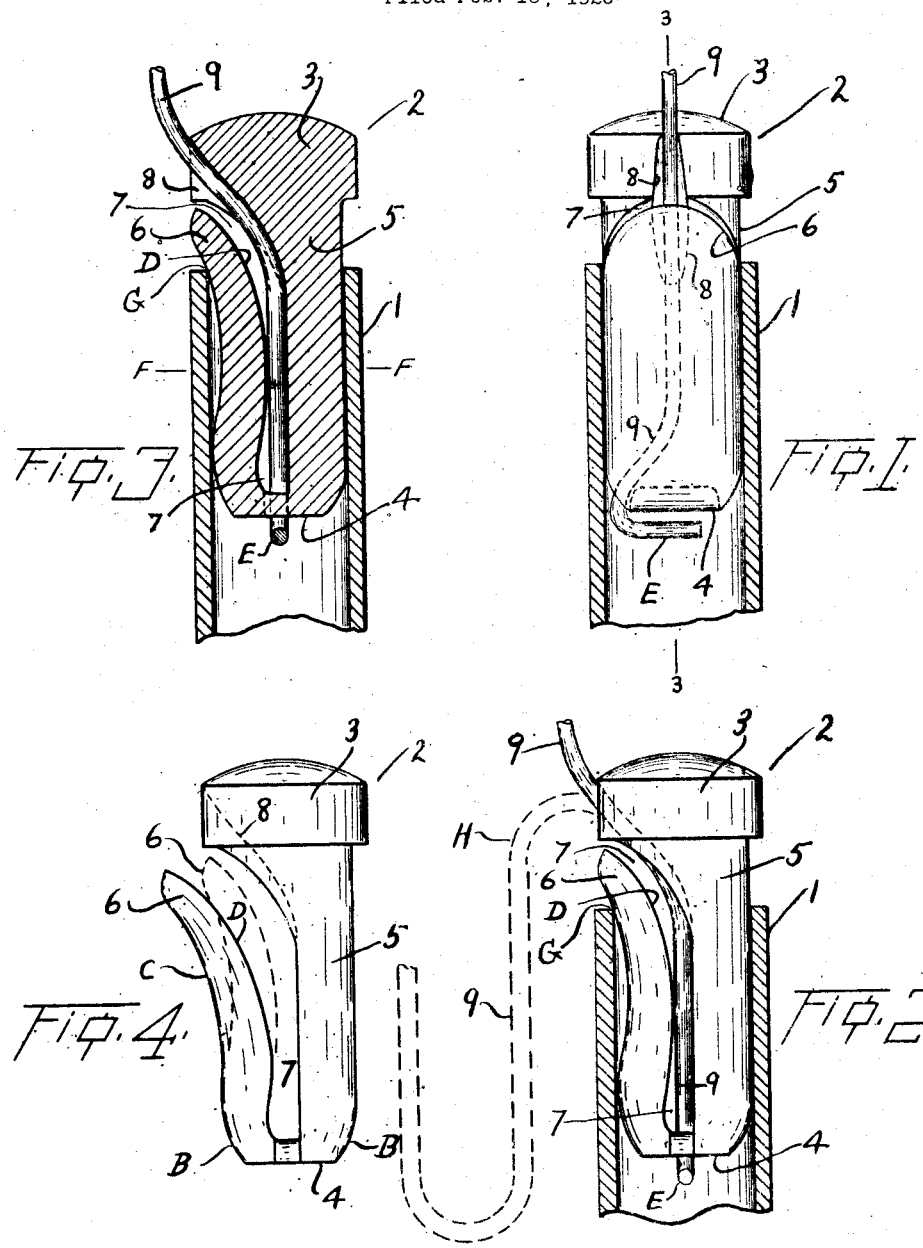

1,597,169

UNITED STATES PATENT OFFICE.

HERBERT MUNRO TAYLOR, OF TORONTO, ONTARIO, CANADA, ASSIGNOR OF ONE-HALF TO FRANK SUTCLIFFE, OF CONSHOHOCKEN, PENNSYLVANIA.

GROUND-PIPE FITTING.

Application filed February 16, 1925. Serial No. 9,696, and in Canada December 27, 1924.

My invention relates to improvements in ground pipe fittings and the object of the invention is to devise a novel form of fitting for ground pipes which will be more secure and reliable than those hitherto used; a further object is to provide a fitting which will not distort or unduly strain the pipe; a further object is to provide such a fitting in which the insertion of it into position within the pipe will operate to securely grip and hold the wire; and a still further object is to provide a form of fitting which may be used either as a cap for securing a wire to the upper end of a ground pipe or as a driving point for the lower end of the pipe.

Other objects will appear in the course of the following specification.

My invention consists essentially of the construction and arrangement of parts all as hereinafter more particularly described and illustrated in the accompanying drawings in which:—

Fig. 1 is an elevational view showing a wire connected to a ground pipe by means of my invention, the upper end of the ground pipe being shown in section.

Fig. 2 is a similar view taken at right angles to Fig. 1.

Fig. 3 is a section on the line 3—3 of Fig. 1.

Fig. 4 is a detached elevational view of my improved fitting, the normal form of the fitting before insertion into a ground pipe being shown in full lines and the collapsed form occupied after insertion within a pipe being indicated in broken lines.

In the drawings, like characters of reference indicate corresponding parts in the various views.

In the form of my invention illustrated, 1 indicates a ground pipe and 2 is my improved fitting therefor.

The fitting 2 comprises a head portion 3 and a shank or plug portion 4.

The plug 4 comprises a body portion 5 and a tongue 6 formed integrally therewith and connected thereto at its inner end.

The tongue 6 is disposed in spaced relation to the body portion 5 so as to form a gap 7 between it and the body portion.

This gap 7 forms a slot extending from one end of the plug portion 4 into proximity to the other end.

The outer face of the body portion 5 is cylindrical with the exception of a small section at the inner end at "B" which is tapered.

The tongue 6 is so formed that it normally extends outwardly beyond the radius of the cylindrical surface of the body portion 5 (see full lines in Fig. 4) and the outer face is concave at "C".

The inner face of the tongue is convex at "D" the purpose of which will presently be explained.

The head cap 3 and body portion 5 of the fitting are recessed at 8, the purpose of which will hereinafter appear.

A wire connected to the ground pipe 1 by means of my fitting is indicated by the numeral 9.

The construction and operation of my invention is as follows:

When it is desired to connect the wire 9 to the ground pipe 1, the wire is simply inserted downwardly into the slot or gap 7 between the tongue 6 and body portion 5 of the plug 4.

In order to insure that the wire is inserted to a sufficient depth, it is best to let it project beyond the bottom end of the slot 7 and its end be bent around the end of the plug as at E.

The fitting is now simply inserted into the pipe 1, the tapered end "B" facilitating entry into the pipe.

The fitting is driven home into the pipe and in its passage thereinto, the outer face "C" of the tongue 6 co-operates with the end of the pipe 1 so that the tongue is forced inwardly towards the body portion 5 and closes in the gap 7 so that the wire is securely gripped between the tongue 6 and body portion 5.

The inner face "D" of the tongue 6 being convex, a section of least width at "FF" is formed intermediately of the length of the gap 7 when the fitting has been inserted into position within the pipe and it is at this section "FF" that the wire 9 is gripped, when the fitting is driven home into the pipe (see Fig. 3).

Further, the outer concave face "C" of the tongue 6 is so disposed that at this section "FF" this outer face is not in contact with the pipe so that there is no dead crushing grip of the wire 9, and as the plug is driven into the pipe the tongue 6 may yield inwardly sufficiently to relieve any excessive bursting strain upon the pipe.

This is due to the fact that at the section "FF" when the fitting is driven into its operative position within the pipe 1, the sum of the dimensions taken at the section "FF", of the thickness of the body portion 5, plus the width of the gap 7, plus the thickness of the tongue 6, is less than the diameter of the pipe 1 and also to the fact that the tongue above and below this section "FF" may yield inwardly.

This section "FF" at which the wire is gripped lies intermediately between the inner end of the plug 4 and the point "G" at which the outer end of the pipe engages the tongue 6.

The wire 9 lies within the recess 8 in the fitting.

While I have particularly described and illustrated the application of my invention to a plug for connecting a wire to a ground pipe, it will be apparent that the same construction could be readily used to provide a driving point for ground pipes in which case the fitting would be just as illustrated except that the head would be pointed instead of blunt.

Obviously the wire 9 may be led away from the pipe in any way desired. For instance instead of leading directly upwardly as illustrated in Figs. 1 and 3 and in full lines in Fig. 2 it might be lead downwardly as shown in broken lines at "H" in Fig. 2.

From the foregoing it will be apparent that I have devised a novel form of ground pipe fitting whereby the objects of my invention have been attained.

What I claim as my invention is:

1. A ground pipe fitting comprising a head portion and a plug portion, said plug portion formed with a body portion and a tongue integrally connected to the body portion at the inner end thereof, said tongue spaced away from the body portion, directed towards the head and inclined away from the body portion.

2. A ground pipe fitting comprising a head portion and a plug portion, said plug portion formed with a body portion and a tongue integrally connected to the body portion at the inner end thereof, said tongue spaced away from the body portion, directed towards the head and inclined away from the body portion, the tongue being concave on its outer side and convex towards the body portion on its inner side.

HERBERT MUNRO TAYLOR.